(12) United States Patent
Fukue

(10) Patent No.: US 7,557,919 B2
(45) Date of Patent: Jul. 7, 2009

(54) APPARATUS FOR DETECTING POSITION OF SUBSTRATE, ELLIPSOMETER, AND FILM THICKNESS MEASURING APPARATUS

(75) Inventor: Kumiko Fukue, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 12/197,728

(22) Filed: Aug. 25, 2008

(65) Prior Publication Data

US 2009/0059229 A1     Mar. 5, 2009

(30) Foreign Application Priority Data

Sep. 4, 2007    (JP) ................ P2007-229055

(51) Int. Cl.
*G01J 4/00*    (2006.01)
(52) U.S. Cl. ................................ 356/369
(58) Field of Classification Search ........... 356/369; 250/559.09, 225
See application file for complete search history.

(56) References Cited

U.S. PATENT DOCUMENTS 6,376,852 B2 *    4/2002    Watanabe et al. ...... 250/559.22
6,433,877 B2 *    8/2002    Watanabe et al. ........... 356/600
6,937,333 B2 *    8/2005    Horie et al. ................. 356/369

FOREIGN PATENT DOCUMENTS

JP    2004-363218    12/2004

* cited by examiner

*Primary Examiner*—Roy Punnoose
(74) *Attorney, Agent, or Firm*—McDermott Will & Emery LLP

(57) ABSTRACT

In an apparatus for detecting a position of a substrate in a film thickness measuring apparatus, an image pickup area on a substrate by an image pickup device of an imaging part is rotated by a rotation mechanism of a position detecting part. With this operation, an image of an edge of the substrate can be easily picked up at a plurality of image pickup positions around a central axis to detect a position of the substrate, without providing a mechanism for rotating a stage holding the substrate. As a result, it is possible to suppress upsizing of a structure for detecting a position of the substrate in the film thickness measuring apparatus and to achieve high-speed and high precision-position detection of the substrate, as compared with a conventional apparatus where a mechanism for rotating a substrate is provided above a mechanism for moving the substrate in a horizontal direction.

19 Claims, 6 Drawing Sheets

APPARATUS FOR DETECTING POSITION OF SUBSTRATE, ELLIPSOMETER, AND FILM THICKNESS MEASURING APPARATUS

BACKGROUND OF THE INVENTION

1. Field of the Invention

The present invention relates to an apparatus for detecting a position of a substrate, and also relates to an ellipsometer and a film thickness measuring apparatus.

2. Description of the Background Art

Conventionally, when various processings, measurements, or the like are performed on a semiconductor substrate (hereinafter, simply referred to as "substrate"), a relative position of the substrate to a mechanism which is used for the processings or measurements is detected and adjustment of a position or an orientation of the substrate (i.e., adjustment of a rotational position) is performed.

For example, in a pre-aligner disclosed in Japanese Patent Application Laid-Open No. 2004-363218 (Document 1), light is applied from a floodlight lamp positioned above a peripheral portion of an approximately circular wafer to the wafer which rotates around a rotation axis along the vertical direction and light after passing through a notch of the wafer is received by a photodetector positioned below the peripheral portion of the wafer and thereby, a position of the notch of the wafer is detected and the wafer is positioned on the basis of a detection result. In the pre-aligner, even in a case where the peripheral portion of the wafer deviates from a predetermined position due to tolerances of wafer diameter, eccentricity of the wafer on a stage or the like, a notch detecting sensor having the floodlight lamp and the photodetector is linearly moved in a radial direction of the wafer and positioned above the peripheral portion of the wafer, to thereby surely detect the notch of the wafer.

An ellipsometer for measuring a thickness of a film formed on a substrate or the like is used as one of apparatuses for performing optical measurement on a substrate. In the ellipsometer, polarized light is applied to a measurement surface of an object from a light irradiation part so as to incline to the measurement surface, and reflected light of the polarized light is received by a light receiving part, to acquire a polarization state. Ellipsometry of the reflected light is performed to obtain a film thickness on the substrate and a surface state of the measurement surface.

In such an ellipsometer, it is necessary that a relative position of the substrate to the light irradiation part and the light receiving part is accurately adjusted before measurement. Especially, in a case where ellipsometry of a substrate having a fine pattern is performed, higher precision-position detection and position adjustment of the substrate must be performed.

However, like in Document 1, if a mechanism for rotating the stage holding a substrate is provided for position detection of the substrate, the whole apparatus is upsized. Also, with recent upsizing of a substrate, the stage and the mechanism for rotating the stage are further upsized.

SUMMARY OF THE INVENTION

The present invention is intended for an apparatus for detecting a position of a substrate. It is a main object of the present invention to suppress upsizing of the apparatus and achieve high-speed and high precision-position detection.

The apparatus comprises: a base part; a substrate holding part which is provided above the base part, for holding an approximately disk-shaped substrate; an imaging part for acquiring a substrate image including a part of an edge of the substrate, a position of the substrate being fixed relatively to the base part; a rotation mechanism for rotating an image pickup area of the imaging part around a predetermined central axis to move the image pickup area along the edge, the central axis being perpendicular to a main surface of the substrate and fixed relatively to the base part; an imaging control part which picks up three or more substrate images at three or more image pickup positions around the central axis by controlling the imaging part and the rotation mechanism, and outputs the three or more substrate images, each of which includes a part of the edge of the substrate; and a substrate position calculation part for obtaining a relative position of the substrate to the base part in directions parallel to the main surface of the substrate, on the basis of the three or more substrate images. In the apparatus, with rotation of the image pickup area by the rotation mechanism, an image of the edge of the substrate can be easily picked up at a plurality of image pickup positions in a circumferential direction to detect a position of the substrate, without providing a mechanism for rotating the substrate holding part. As a result, it is possible to suppress upsizing of the apparatus and achieve high-speed and high precision-position detection.

According to a preferred embodiment of the present invention, the rotation mechanism rotates the image pickup area along the edge of the substrate by rotating the imaging part having an image pickup device around the central axis. With this structure, it is possible to simplify a structure of the apparatus.

According to another preferred embodiment of the present invention, the imaging part comprises: an image pickup device which is fixed relatively to the central axis; and an imaging optical system for directing light from the image pickup area to the image pickup device, and the rotation mechanism rotates the image pickup area along the edge of the substrate by rotating the imaging optical system around the central axis. Thus, the image pickup device can be easily positioned.

Preferably, the image pickup device is a line sensor having a plurality of light receiving elements arranged in a line, an arrangement direction of the plurality of light receiving elements corresponds to a radial direction with respect to the central axis in the image pickup area on the substrate, and the image pickup area is rotated once along the edge while the image pickup device performs a continuous image pickup, to pick up an image of a whole of the edge of the substrate.

Or, the image pickup device is a two-dimensional image pickup device having a plurality of light receiving elements which are arranged two-dimensionally along two arrangement directions perpendicular to each other, and a direction corresponding to one arrangement direction of the plurality of light receiving elements is parallel to a radial direction with respect to the central axis in the image pickup area on the substrate. More preferably, the image pickup area is rotated once along the edge while the image pickup device repeats an image pickup, to pick up an image of a whole of the edge of the substrate.

According to another preferred embodiment of the present invention, one of the three or more substrate images is an image including a notch formed on the edge of the substrate.

According to still another preferred embodiment of the present invention, a distance in a radial direction with respect to the central axis between the central axis and a center of the image pickup area is changeable by the rotation mechanism.

The present invention is also intended for an ellipsometer and a film thickness measuring apparatus for measuring a thickness of a film formed on a substrate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
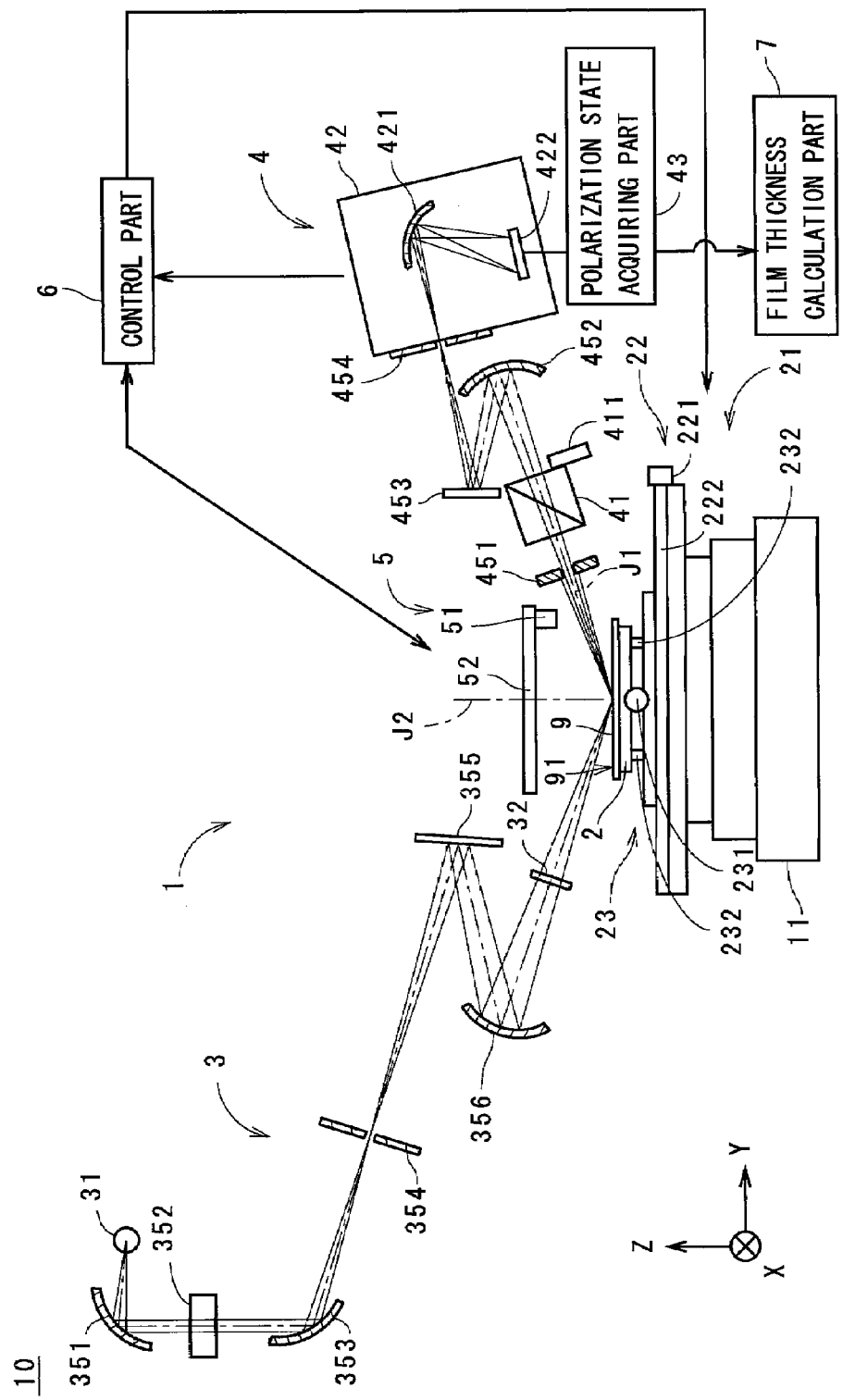
FIG. 1 is a view showing a construction of a film thickness measuring apparatus in accordance with the first preferred embodiment.

FIG. 1 is a view showing a construction of a film thickness measuring apparatus 10 in accordance with the first preferred embodiment of the present invention. The film thickness measuring apparatus 10 is an apparatus for measuring a thickness of a thin film (a single layer film or a multilayer film) formed on a semiconductor substrate 9 which is a measurement object. In the following discussion, the semiconductor substrate 9 is simply referred to as a "substrate 9". In FIG. 1, a part of the construction of the film thickness measuring apparatus 10 is shown cross-sectionally and an internal construction of a spectrometer 42 is shown.

As shown in FIG. 1, the film thickness measuring apparatus 10 has a spectroscopic ellipsometer 1 for applying polarized light to a main surface 91 on the substrate 9, a thin film being formed on the main surface 91 (i.e., the main surface 91 is a main surface to be measured on the (+Z) side in FIG. 1 and hereinafter, referred to as a "measurement surface 91"), to acquire information which is used to perform ellipsometry on the measurement surface 91 and a film thickness calculation part 7 for performing ellipsometry on the basis of the information acquired by the spectroscopic ellipsometer 1 to obtain a thickness of the film formed on the measurement surface 91.

The spectroscopic ellipsometer 1 has a base part 11, a stage 2 which is a substrate holding part provided above the base part 11, for holding the approximately disk-shaped substrate 9, a stage moving mechanism 21 which is a holding part moving mechanism for moving the stage 2 relatively to the base part 11 in a direction parallel to the measurement surface 91 of the substrate 9, a lighting part 3 for directing polarized light to the measurement surface 91 of the substrate 9 which is held on the stage 2, the polarized light being inclined to the measurement surface 91, a light receiving part 4 for receiving reflected light of the polarized light, a position detecting part 5 used for position detection of the substrate 9, and a control part 6 which is constituted of a CPU for performing various computations, a memory for storing various pieces of information and the like and controls the above constituent elements.

Figure 2:
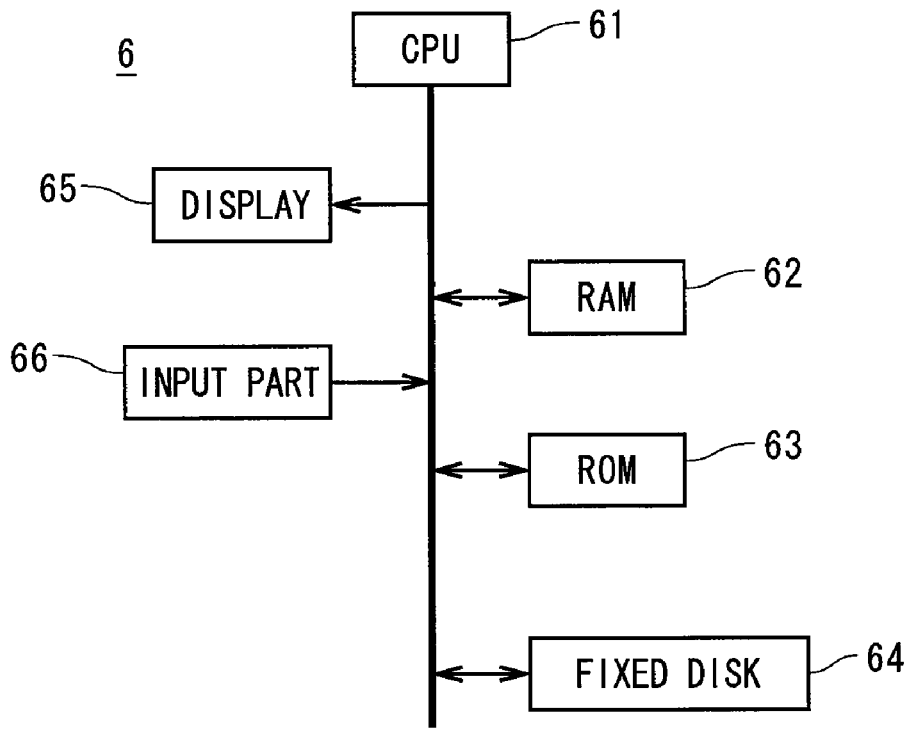
FIG. 2 is a view showing a constitution of a control part.

FIG. 2 is a view showing a constitution of the control part 6. As shown in FIG. 2, the control part 6 has a construction, like a general-type computer, in which a CPU 61 for performing various computations, a RAM 62 storing programs to be executed and serving as a work area for various computations, a ROM 63 for storing a basic program, a fixed disk 64 for storing various pieces of information, a display 65 for displaying various pieces of information to an operator, an input part 66 such as a keyboard and a mouse, and the like are all connected to one another.

Figure 3:
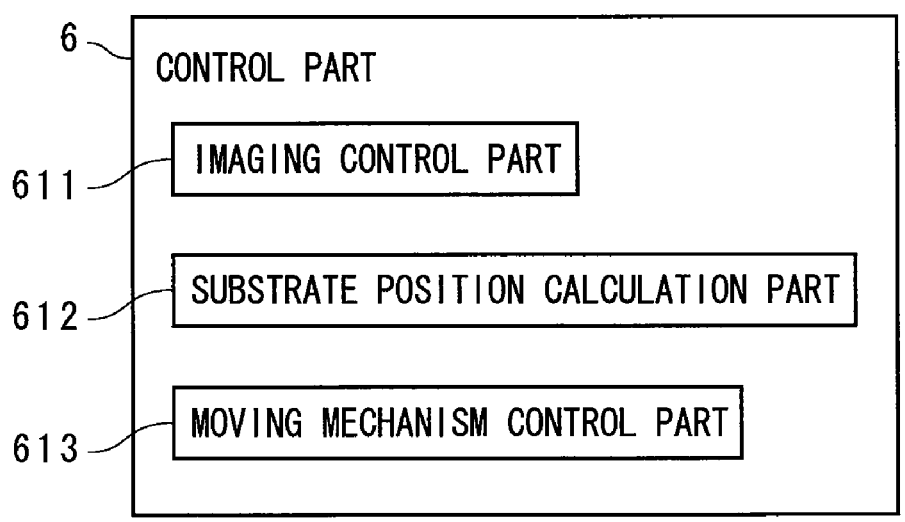
FIG. 3 is a block diagram showing functions of the control part.

FIG. 3 is a block diagram showing functions implemented through computations performed by the CPU 61 and the like in the control part 6 (see FIG. 2) in accordance with the program. An imaging control part 611, a substrate position calculation part 612, and a moving mechanism control part 613 in FIG. 3 correspond to functions implemented by the CPU 61 and the like. These functions may be implemented by a plurality of computers.

As shown in FIG. 1, the stage moving mechanism 21 has a Y-direction moving mechanism 22 for moving the stage 2 in the Y direction of FIG. 1 and an X-direction moving mechanism 23 for moving the stage 2 in the X direction, and the stage moving mechanism 21 moves the substrate 9 together with the stage 2 in two directions (the X direction and the Y direction) perpendicular to each other. The Y-direction moving mechanism 22 has a motor 221 and a ball screw (not shown) connected with the motor 221, and with rotation of the motor 221, the X-direction moving mechanism 23 moves in the Y direction of FIG. 1 along guide rails 222. The X-direction moving mechanism 23 has the same constitution as the Y-direction moving mechanism 22, and with rotation of a motor 231, the stage 2 is moved by a ball screw (not shown) in the X direction along guide rails 232.

The lighting part 3 has a light source 31 which is a high-intensity xenon (Xe) lamp for emitting white light, various optical elements for directing light from the light source 31, and a sheet-like (or a thin-plate) polarizer 32. The light emitted from the light source 31 is incident on the polarizer 32 through an ellipsoidal mirror 351, an infrared cut filter 352, an ellipsoidal mirror 353, a slit plate 354, a plane mirror 355 and an ellipsoidal mirror 356. The light emitted from the light source 31 is polarized by the polarizer 32 and the polarized light enters the measurement surface 91 of the substrate 9 so as to incline to the measurement surface 91 (at an incident angle of 70 degrees in the present preferred embodiment).

The light receiving part 4 has an analyzer 41 where the reflected light of the polarized light enters, an analyzer rotation mechanism 411 for rotating the analyzer 41 around a central axis parallel to an optical axis J1, the spectrometer 42 of grating type for receiving the reflected light after passing through the analyzer 41, various optical elements for directing the reflected light to the spectrometer 42, and a polarization state acquiring part 43 connected to the spectrometer 42. In the light receiving part 4, reflected light reflected on the measurement surface 91 of the substrate 9 is led to the rotating analyzer 41 through a slit plate 451, and the reflected light after passing through the analyzer 41 enters the spectrometer 42 through an ellipsoidal mirror 452, a plane mirror 453 and a slit plate 454.

Reflected light incident on the spectrometer 42 is reflected on a grating 421 which is a spectroscopic device and dispersed into light at each wavelength with high wavelength resolution. Dispersed light dispersed by the grating 421 is received by the light receiving device 422 and intensity of light at each wavelength (e.g., each wavelength from ultraviolet ray to near-infrared ray) is measured with high sensitivity.

The spectral intensity of the reflected light acquired by the light receiving device 422 is outputted to the polarization state acquiring part 43 and in the polarization state acquiring part 43, the spectral intensity of the reflected light is associated with the rotation angle of the analyzer 41 on the basis of outputs of the light receiving device 422 and the analyzer rotation mechanism 411, to acquire a polarization state at each wavelength of the reflected light, specifically, a phase difference $\Delta$ between a p-polarized component and an s-polarized component at each wavelength and an angle $\Psi$ whose tangent gives an amplitude ratio of these reflected polarized components (i.e., a complex amplitude ratio). The polarization state at each wavelength acquired by the light receiving part 4 in the spectroscopic ellipsometer 1, is outputted to the film thickness calculation part 7 from the polarization state acquiring part 43, and ellipsometry is performed on the basis of the polarization state to obtain a thickness of the film formed on the measurement surface 91 of the substrate 9.

Figure 4:
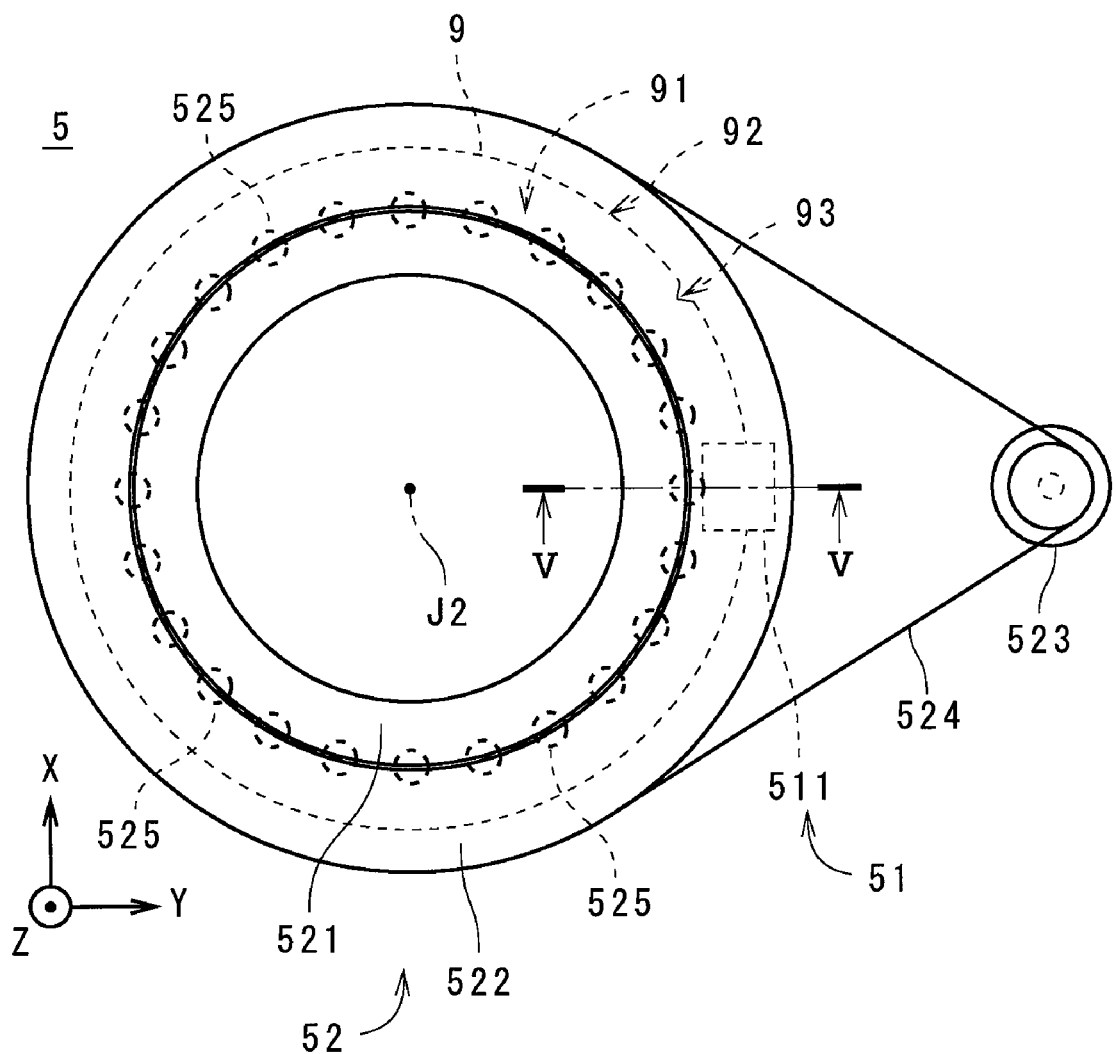
FIG. 4 is a plan view showing a position detecting part.
Figure 5:
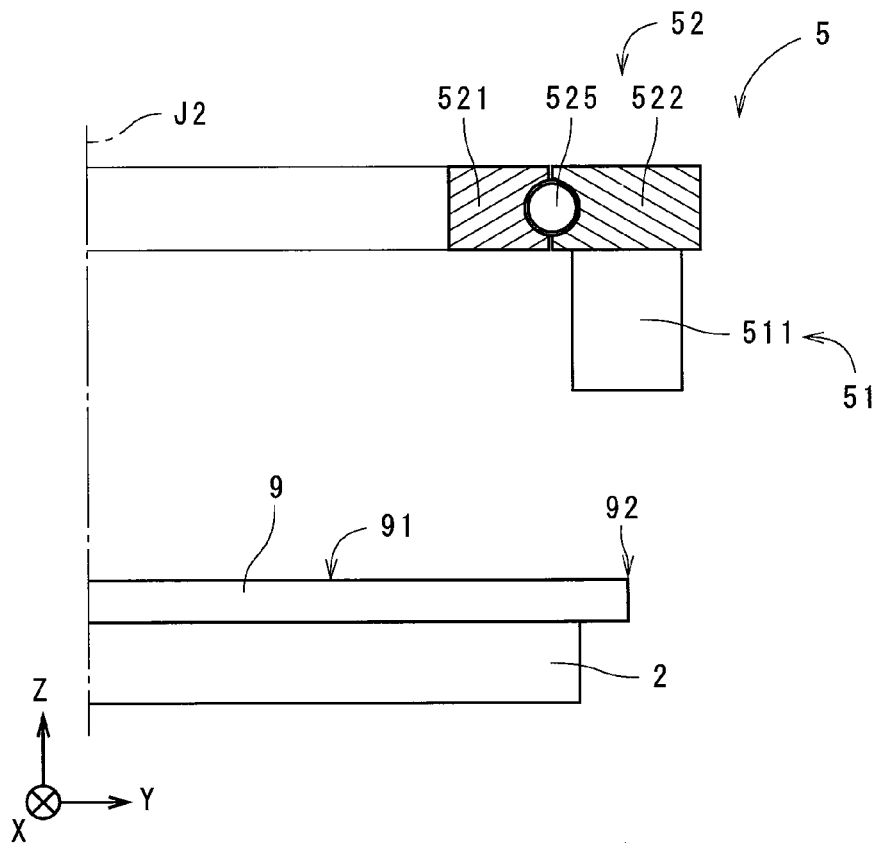
FIG. 5 is a front view showing part of the position detecting part.

FIG. 4 is an enlarged plan view showing the position detecting part 5 together with the substrate 9. FIG. 5 is an enlarged plan view showing part of the position detecting part 5 together with the substrate 9 and the stage 2. In FIG. 5, a part of the position detecting part 5 is cross-sectionally shown at positions indicated by the arrows V-V in FIG. 4.

As shown in FIGS. 4 and 5, the position detecting part 5 has an imaging part 51 having an image pickup device 511 for acquiring an image including a part of an edge 92 of the measurement surface 91 of the substrate 9 (the image is hereinafter referred to as a "substrate image") and a rotation mechanism 52 for rotating the imaging part 51 around a predetermined central axis J2 which is perpendicular to the measurement surface 91 of the substrate 9 and fixed relatively to the base part 11 (see FIG. 1). As shown in FIG. 4, a notch 93 used for detection of orientation of the substrate 9 in a circumferential direction (i.e., a rotational position of the substrate 9 around the central axis J2) is formed on the edge 92 of the approximately circular measurement surface 91 of the substrate 9.

In the imaging part 51, a two-dimensional image pickup device having a plurality of light receiving elements of CCD (charge coupled device) type, the plurality of light receiving elements being arranged two-dimensionally along two arrangement directions perpendicular to each other, is used as the image pickup device 511. In an image pickup area of the image pickup device 51 on the measurement surface 91 of the substrate 9, a direction corresponding to one arrangement direction of the plurality of light receiving elements is parallel to a radial direction with respect to the central axis J2 (i.e., the radial direction which passes through the central axis J2, being perpendicular to the central axis J2).

As shown in FIGS. 4 and 5, the rotation mechanism 52 has a ring-shaped fixed part 521 which is fixed on the base part 11 (see FIG. 1) with interposing a flame (not shown) and a ring-shaped rotating part 522 which is rotatably supported on the side of circumference of the fixed part 521 with interposing a plurality of balls 525. The rotation mechanism 52 further has a motor 523 for rotating the rotating part 522 through a timing belt 524, as shown in FIG. 4. In the present preferred embodiment, a stepping motor is used as the motor 523, and the image pickup device 511 in the imaging part 51 is fixed on a lower surface of the rotating part 522, the lower surface facing the substrate 9 on the (−Z) side.

In the position detecting part 5, the rotating part 522 which is a ring shape around the central axis J2 rotates around the central axis J2 by the motor 523, together with the imaging part 51, and the image pickup area of the imaging part 51 rotates around the central axis J2 along the edge 92 of the substrate 9. That is, the rotation mechanism 52 serves as a rotation mechanism for rotating the image pickup area of the imaging part 51 to move the image pickup area along the edge 92 of the substrate 9.

Figure 6:
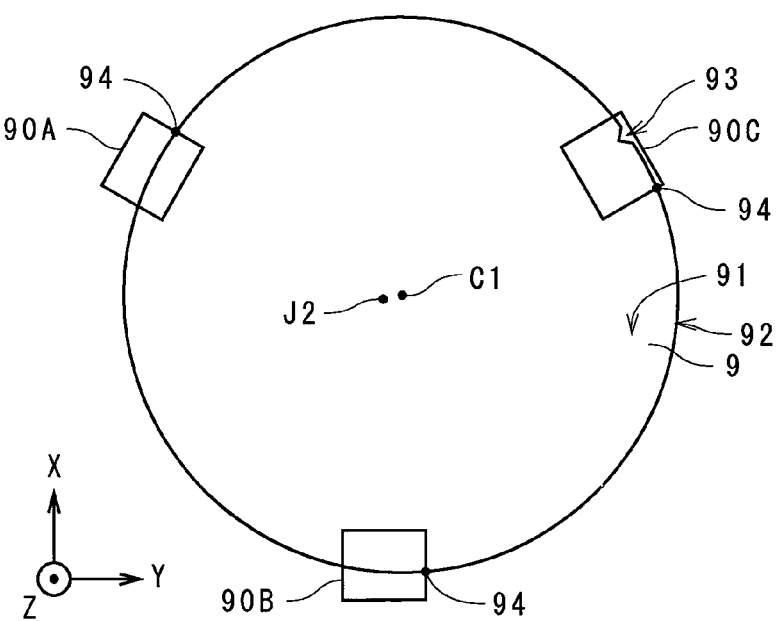
FIG. 6 is a view showing substrate images.

In the film thickness measuring apparatus 10 shown in FIG. 1, the imaging control part 611 (see FIG. 3) in the control part 6 controls the imaging part 51 and the rotation mechanism 52 and thereby, the image pickup device 511 (see FIGS. 4 and 5) in the imaging part 51 picks up three substrate images at three image pickup positions around the central axis J2 while rotating around the central axis J2, in a state where positions of the substrate 9 and the stage 2 are fixed relatively to the base part 11 (in a state where movement of the stage 2 by the stage moving mechanism 21 is stopped). The three substrate images, each of which includes a part of the edge 92 of the substrate 9, are outputted from the image pickup device 511 to the substrate position calculation part 612 (see FIG. 3). In the present preferred embodiment, three substrate images 90A to 90C are acquired at three image pickup positions which are defined at equal pitches (pitches of 120 degrees) in the circumferential direction, as shown in FIG. 6.

Subsequently, in the substrate position calculation part 612, a relative position of the substrate 9 to the central axis J2 (i.e., a relative position of the substrate 9 to the base part 11) in the X direction and the Y direction which are parallel to the measurement surface 91, is obtained on the basis of the three substrate images 90A to 90C. Specifically, in the substrate position calculation part 612, the edge 92 of the substrate 9 is detected in each of the three substrate images 90A to 90C, and a coordinate value in the XY plane of a point on the edge 92 in each substrate image, the point being farthest from the central axis J2 (the point is hereinafter referred to as a "farthest point 94"), is acquired. A coordinate value of a center C1 of a circle passing through three farthest points 94 (i.e., a coordinate value of the center of the substrate 9) is obtained on the basis of coordinate values of the three farthest points 94, and a relative position of the center C1 of the circle to the central axis J2 is detected as a relative position of the substrate 9 to the central axis J2. The relative position of the substrate 9 to the central axis J2 is obtained more easily by acquiring the coordinate values of the three farthest points 94 with using the central axis J2 as the original point.

After the position of the substrate 9 is detected by the substrate position calculation part 612, the stage moving mechanism 21 is controlled by the moving mechanism control part 613 (see FIG. 3) on the basis of the relative position of the substrate 9 to the central axis J2 (i.e., the relative position of the substrate 9 to the base part 11) shown in FIG. 1, the relative position of the substrate 9 to the central axis J2 is adjusted, and then the center C1 (see FIG. 6) of the substrate 9 is moved to a position overlapping with the central axis J2. Next, the substrate 9 is moved by the stage moving mechanism 21 so that an area to be a measurement target on the measurement surface 91 of the substrate 9 is positioned at an irradiation position of the polarized light from the lighting part 3, the polarized light is applied from the lighting part 3 to the substrate 9, and the reflected light reflected on the measurement surface 91 of the substrate 9 is received by the spectrometer 42 in the light receiving part 4. Then, a film thickness on the substrate 9 is obtained by the film thickness calculation part 7 on the basis of the polarization state at each wavelength acquired from the output of the spectrometer 42 by the polarization state acquiring part 43.

As discussed above, in the film thickness measuring apparatus 10, the base part 11, the stage 2, the position detecting part 5, the imaging control part 611, and the substrate position calculation part 612 serve as an apparatus for detecting a position of a substrate. The image pickup area of the image pickup device 511 is rotated by the rotation mechanism 52 in the position detecting part 5 and thereby, an image of the edge 92 of the substrate 9 can be easily picked up at a plurality of image pickup positions in the circumferential direction to detect a position of the substrate 9, without providing a mechanism for rotating the stage 2 for holding the substrate 9. With this structure, it is possible to suppress upsizing of a structure for detecting a position of a substrate in the film thickness measuring apparatus 10 and achieve high-speed and high precision-position detection of the substrate 9, as compared with the conventional apparatus where detecting a position of a substrate is performed by rotating the substrate.

In the film thickness measuring apparatus 10, since the constituent elements serving as the apparatus for detecting a position of a substrate, the stage moving mechanism 21, and the moving mechanism control part 613 function as a substrate position adjusting apparatus for adjusting a position of a substrate, adjusting position of the substrate 9 can be achieved at high speed and with high precision. The polarization state of the reflected light reflected on the measurement surface 91 of the substrate 9 is acquired with high positional accuracy by the spectroscopic ellipsometer 1 having the substrate position adjusting apparatus, the lighting part 3, and the light receiving part 4, and as a result, it is possible to achieve high precision-film thickness measurement on the measurement surface 91 of the substrate 9 in the film thick measuring apparatus 10. Further, it is possible to achieve film thickness measurement on an upsized substrate by a compact apparatus.

In the film thickness measuring apparatus 10, the image pickup area is rotated by rotating the image pickup device 511 of the imaging part 51 in the rotation mechanism 52, and it is therefore possible to simplify the structure of the position detecting part 5 (i.e., the structure for position detection). In the image pickup area on the substrate 9, since a direction corresponding to one arrangement direction of the light receiving elements in the image pickup device 511 which is a two-dimensional CCD camera is parallel to the radial direction with respect to the central axis J2, a coordinate value of a point on the edge 92 in a coordinate system fixed on each substrate image can be easily converted into a coordinate value in a polar coordinate system around the central axis J2 which is fixed relatively to the base part 11 in the film thickness measuring apparatus 10. Thus, it is possible to easily obtain a coordinate value of the farthest point 94 on the edge 92 in each substrate image and as a result, detecting a position of the substrate 9 can be easily performed.

The orientation of the substrate 9 (i.e., the orientation of the notch 93 on the edge 92) is adjusted in another apparatus before the substrate 9 is placed on the stage 2 in the film thickness measuring apparatus 10, however, there is a case where the orientation of the substrate 9 slightly deviates when the substrate 9 is placed on the stage 2 or the like. In the film thickness measuring apparatus 10, since one of the three substrate images 90A to 90C shown in FIG. 6 (the substrate image 90C in the present preferred embodiment) is an image including the notch 93 formed on the edge 92, it is possible to easily detect the orientation of the substrate 9 by obtaining a position of the notch 93. Therefore, even in the case that the orientation of the substrate 9 deviates from a predetermined orientation on the stage 2, the position of the irradiation region of the polarized light on the measurement surface 91 of the substrate 9 is modified on the basis of a positional difference and thereby, it is possible to acquire the polarization state of the reflected light reflected on the measurement surface 91 of the substrate 9 with higher positional accuracy, to achieve higher precision-film thickness measurement.

Though the three substrate images 90A to 90C around the central axis J2 (in the circumferential direction) are acquired by the position detecting part 5 in the above preferred embodiment, the relative position of the substrate 9 to the central axis J2 (i.e., the relative position of the substrate 9 to the base part 11) may be detected on the basis of four or more substrate images which are acquired at four or more (e.g., six or eight) image pickup positions around the central axis J2, in accordance with the accuracy required for position detection of the substrate 9. In this case, one of the four substrate images is an image including the notch 93 and therefore, higher precision-film thickness measurement is achieved similarly to the above-discussed case. There may be a case where the image pickup device 511 is rotated once along the edge 92 (i.e., the image pickup area is rotated once along the edge 92) by the imaging control part 611 (see FIG. 3) in the control part 6 while the image pickup device 511 repeats an image pickup to thereby pickup an image of the whole of the edge 92 of the substrate 9. Then, the position of the substrate 9 is detected on the basis of the image of the whole of the edge 92 and the accuracy for position detection of the substrate 9 is further improved.

Figure 7:
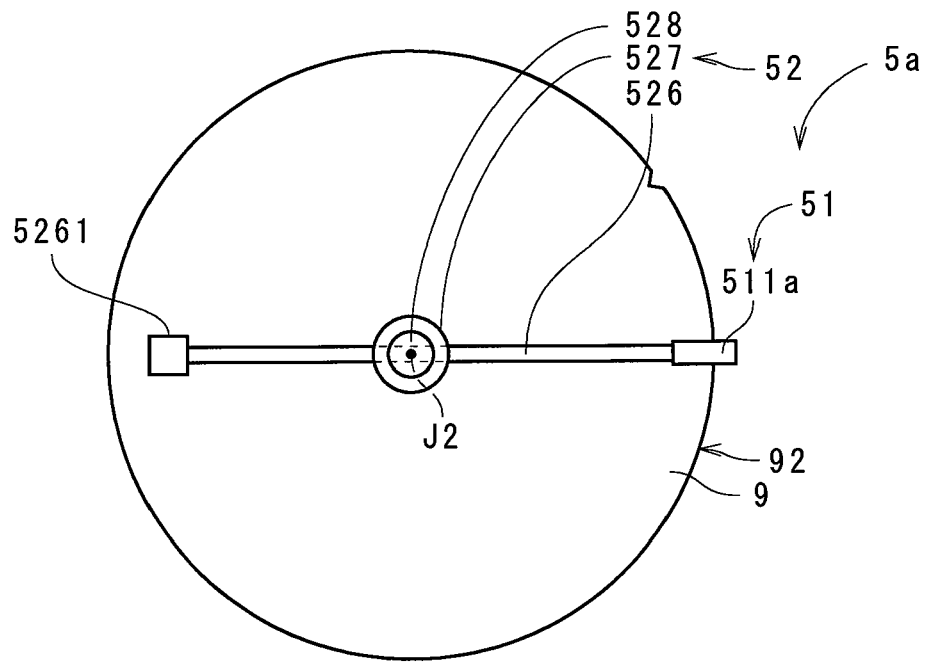
FIG. 7 is a plan view showing a position detecting part in accordance with the second preferred embodiment.
Figure 8:
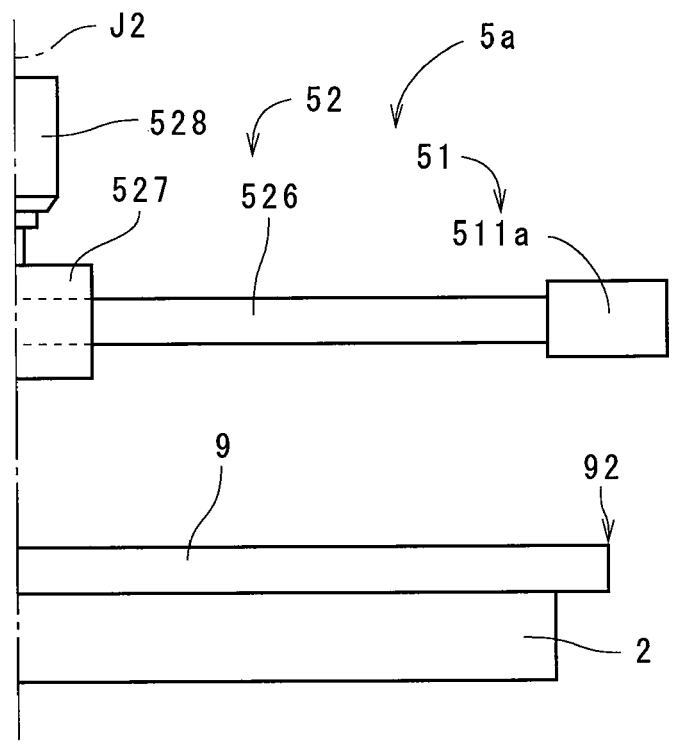
FIG. 8 is a front view showing part of the position detecting part.

Next discussion will be made on a position detecting part in a film thickness measuring apparatus in accordance with the second preferred embodiment of the present invention. FIGS. 7 and 8 are a plan view and a front view each showing the position detecting part according to the second preferred embodiment. A position detecting part 5a having a different structure from the position detecting part 5 shown in FIGS. 2 and 3 is provided in the film thickness measuring apparatus according to the second preferred embodiment. The other constituent elements are the same as those in the first preferred embodiment and represented by the same reference signs in the following description.

As shown in FIGS. 7 and 8, the position detecting part 5a has an imaging part 51 having an image pickup device 511a for acquiring a substrate image and a rotation mechanism 52 for rotating the imaging part 51 around the central axis J2 along an edge 92 of a substrate 9, similarly to the first preferred embodiment. In the imaging part 51, a line sensor having a plurality of light receiving elements which are arranged in a line along a radial direction with respect to the central axis J2 is used as the image pickup device 511a. In an image pickup area of the image pickup device 511a on a measurement surface 91 of the substrate 9, an arrangement direction of the plurality of light receiving elements corresponds to the radial direction with respect to the central axis J2.

The rotation mechanism 52 has a rod supporting member 526 supporting the image pickup device 511a, an approximately cylindrical center member 527 around the central axis J2, having a through hole in a side portion, in which the supporting member 526 is inserted, and a motor 528 which is connected to the center member 527 and rotates the center member 527 and the supporting member 526 around the central axis J2. The supporting member 526 is locked in the center member 527 by a not-shown locking member at a position where a distance from the central axis J2 of the image pickup device 511a becomes a predetermined distance, and a counter weight 5261 which is roughly proportional to a weight of the image pickup device 511a around the center member 527 is provided on an end portion of the supporting member 526, the end portion being opposed to the image pickup device 511a.

In the position detecting part 5a, the image pickup device 511a is rotated by the motor 528 of the rotation mechanism 52, together with the supporting member 526 and the center member 527 and thereby, the image pickup area of the imaging part 511a is rotated around the central axis J2 along the edge 92 of the substrate 9. That is, the rotation mechanism 52 serves as a rotation mechanism for rotating the image pickup area of the imaging part 51 around the central axis J2 to move the image pickup area along the edge 92 of the substrate 9, similarly to the first preferred embodiment.

In the film thickness measuring apparatus according to the second preferred embodiment, the imaging part 51 and the rotation mechanism 52 are controlled by the imaging control part 611 (see FIG. 3) in the control part 6, the image pickup device 511a is rotated once along the edge 92 while performing a continuous image pickup (i.e., the image pickup area of the image pickup device 511a is rotated once along the edge 92) in a state where the substrate 9 and the stage 2 (shown in only FIG. 8) are fixed relatively to the central axis J2 (i.e., a state where the substrate 9 and the stage 2 are fixed relatively to the base part 11 (see FIG. 1)), and then an image of the whole of the edge 92 of the substrate 9 is picked up. The substrate position calculation part 612 (see FIG. 3) detects a relative position of the substrate 9 to the central axis J2 (i.e., a relative position of the substrate 9 to the base part 11) on the basis of the substrate image outputted from the image pickup device 511a.

Thus, similarly to the first preferred embodiment, it is possible to suppress upsizing of a structure for position detection of a substrate in the film thickness measuring apparatus and achieve high-speed and high precision-position detection of the substrate 9. The image pickup area is rotated by rotating the image pickup device 511a of the imaging part 51, and it is therefore possible to simplify the structure of the position detecting part 5a. Further, the position of the substrate 9 is detected on the basis of the image of the whole of the edge 92 and the accuracy for detecting a position of the substrate 9 is further improved.

In the rotation mechanism 52, since the supporting member 526 moves to and from the center member 527, the distance in the radial direction with respect to the central axis J2 between the image pickup device 511a and the central axis J2 is changeable. Therefore, images of edges of a plurality of types of substrates having different sizes (i.e., diameters) are picked up by one image pickup device 511a and it is possible to easily perform detecting positions of the substrates having different sizes.

Figure 9:
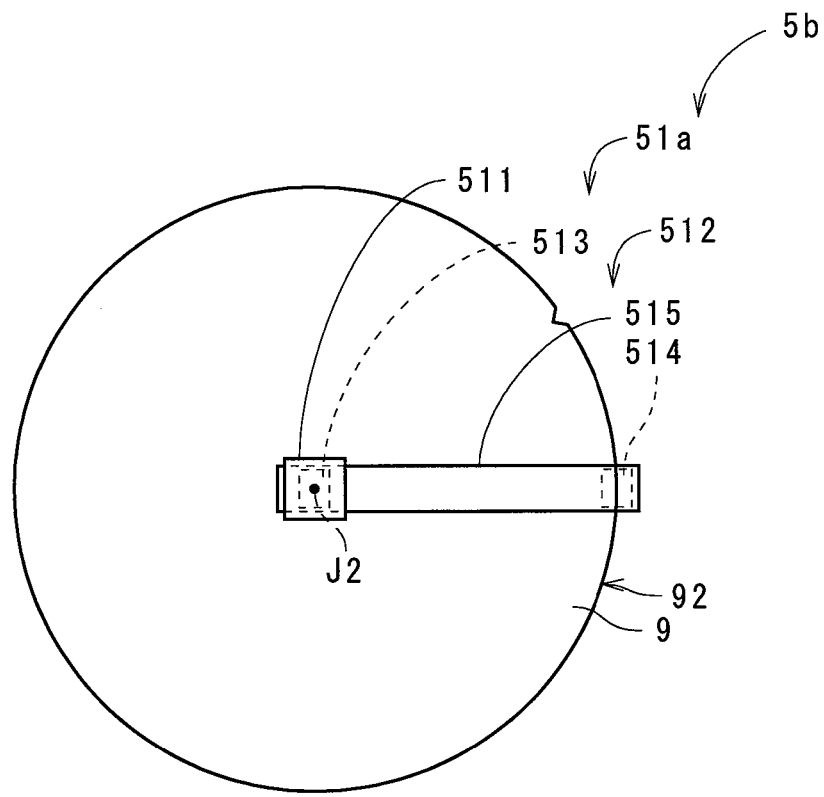
FIG. 9 is a plan view showing a position detecting part in accordance with the third preferred embodiment.
Figure 10:
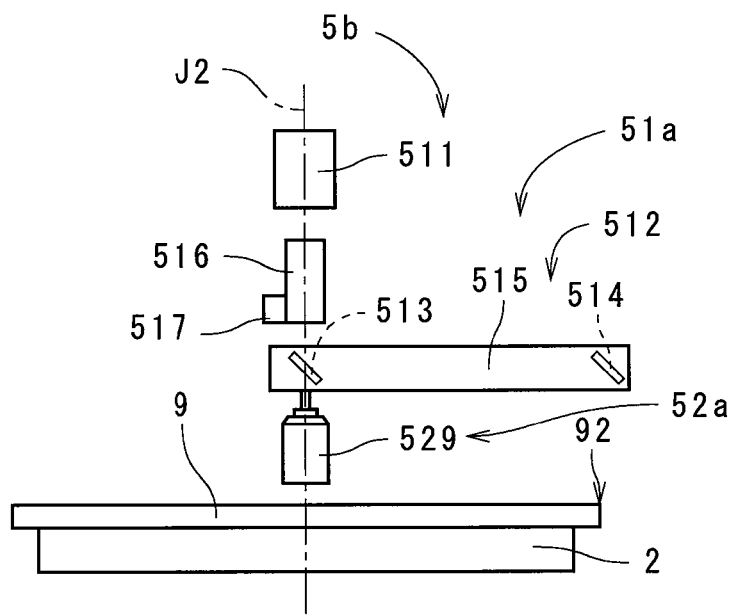
FIG. 10 is a front view showing the position detecting part.

Next discussion will be made on a position detecting part in a film thickness measuring apparatus in accordance with the third preferred embodiment of the present invention. FIGS. 9 and 10 are a plan view and a front view each showing the position detecting part according to the third preferred embodiment. A position detecting part 5b having a different structure from the position detecting part 5 shown in FIGS. 2 and 3 is provided in the film thickness measuring apparatus according to the third preferred embodiment. The other constituent elements are the same as those in the first preferred embodiment and represented by the same reference signs in the following description.

In the position detecting part 5b, as shown in FIGS. 9 and 10, an imaging part 51a has an image pickup device 511 which is a two-dimensional image pickup device similar to the first preferred embodiment and an imaging optical system 512 for directing light from an image pickup area on a measurement surface 91 of a substrate 9 to the image pickup device 511. The imaging optical system 512 has mirrors 513, 514, a mirror holding member 515 for holding the mirrors 513, 514, an image rotating prism 516 which is positioned between the mirror 513 and the image pickup device 511, and a prism rotation mechanism 517 for rotating the image rotating prism 516 around the central axis J2.

The image pickup device 511 is fixed on the base part 11 (see FIG. 1) with interposing a flame (not shown) (i.e., fixed relatively to the central axis J2), and acquires a substrate image through the image rotating prism 516 and the mirrors 513, 514 in the imaging optical system 512. In the imaging part 51a, with rotation of the image rotating prism 516 around the central axis J2, an image of an edge 92 of the substrate 9, the image being formed through the image rotating prism 516, rotates at an angular velocity which is twice an angular velocity of the image rotating prism 516.

As shown in FIG. 10, the position detecting part 5b further has a mirror rotation mechanism 52a for rotating the mirrors 513, 514 together with the mirror holding member 515 in the imaging part 51a around the central axis J2, and the mirror rotation mechanism 52a has a motor 529 which is connected on the (−Z) side of the mirror holding member 515. In the position detecting part 5b, the mirrors 513, 514 are rotated by the motor 529 around the central axis J2 and thereby, the image pickup area of the imaging part 51a is rotated along the edge 92 of the substrate 9 around the central axis J2. That is, the mirror rotation mechanism 52a serves as a rotation mechanism for rotating the image pickup area of the imaging part 51a to move the image pickup area along the edge 92 of the substrate 9.

In the imaging part 51a, the image rotating prism 516 is rotated by the prism rotation mechanism 517 at an angular velocity which is a half of an angular velocity of the mirrors 513, 514 in the same direction as a rotation direction of the mirrors 513, 514, in synchronization with rotation of the mirrors 513, 514 by the mirror rotation mechanism 52a. With this operation, the direction of the substrate image acquired by the image pickup device 511 can be the same regardless of rotational positions of the mirrors 513, 514. In other words, in the image pickup area on the substrate 9 by the image pickup device 511, a direction corresponding to one arrangement direction of light receiving elements of the image pickup device 511 is parallel to a radial direction with respect to the central axis J2, similarly to the first preferred embodiment.

In the film thickness measuring apparatus according to the third preferred embodiment, the imaging part 51a, the mirror rotation mechanism 52a and the prism rotation mechanism 517 are controlled by the imaging control part 611 (see FIG. 3) in the control part 6, the imaging optical system 512 is rotated in a circumferential direction (i.e., the image pickup area of the image pickup device 511 is rotated around the central axis J2) in a state where the substrate 9 and the stage 2 are fixed relatively to the central axis J2 (i.e., a state where the substrate 9 and the stage 2 are fixed relatively to the base part 11 (see FIG. 1)), and then substrate images are acquired at three image pickup positions in the circumferential direction, similarly to the first preferred embodiment. The substrate position calculation part 612 (see FIG. 3) detects a relative position of the substrate 9 to the central axis J2 (i.e., a relative position of the substrate 9 to the base part 11) on the basis of the three substrate images outputted from the image pickup device 511, like in the first preferred embodiment.

Thus, similarly to the first preferred embodiment, it is possible to suppress upsizing of a structure for detecting a position of a substrate in the film thickness measuring apparatus and achieve high-speed and high precision-position detection of the substrate 9. In the image pickup area on the substrate 9, since a direction corresponding to one arrangement direction of the light receiving elements of the image pickup device 511 is parallel to the radial direction, it is possible to easily obtain a coordinate value of the farthest point 94 (see FIG. 6) on the edge 92 in each substrate image and as a result, detecting a position of the substrate 9 can be easily performed.

In the film thickness measuring apparatus according to the third preferred embodiment, especially, since the image pickup area on the substrate 9 is rotated by rotating the mirrors 513, 514 in the imaging optical system 512, the image pickup device 511 is fixed and can be easily positioned. As a result, a wiring can be easily connected to the image pickup device 511 without using a complicated coupling or the like to simplify the structure for the image pickup device 511. Though the image pickup device 511 is positioned on the central axis J2 in the present preferred embodiment, there may be a case where in accordance with an arrangement of other constituent elements in the film thickness measuring apparatus, the image pickup device 511 is positioned at a position away from the central axis J2 and an optical system for directing light from the image rotating prism 516 to the image pickup device 511 is additionally provided.

Though the preferred embodiments of the present invention have been discussed above, the present invention is not limited to the above-discussed preferred embodiments, but allows various variations.

For example, in the film thickness measuring apparatus according to the third preferred embodiment, detecting a position of the substrate 9 may be performed on the basis of four or more substrate images acquired at four or more image pickup positions around the central axis J2. There may be a case where the mirrors 513, 514 in the imaging optical system 512 are rotated once along the edge 92 (i.e., the image pickup area is rotated once along the edge 92) while repeating an image pickup by the image pickup device 511, an image of the whole of the edge 92 of the substrate 9 is picked up and then, detecting a position of the substrate 9 is performed on the basis of the image of the whole of the edge 92.

In the film thickness measuring apparatus according to the third preferred embodiment, a line sensor having a plurality of light receiving elements which are arranged in a line similarly to the second preferred embodiment may be provided instead of the image pickup device 511. In this case, with rotation of the mirrors 513, 514 and the image rotating prism 516, an arrangement direction of the plurality of light receiving elements always corresponds to the radial direction with respect to the central axis J2 in the image pickup area on the substrate 9, the mirrors 513, 514 are rotated once along the edge 92 (i.e., the image pickup area is rotated once along the edge 92) while performing a continuous image pickup by the line sensor, and then an image of the whole of the edge 92 of the substrate 9 is picked up and detecting a position of the substrate 9 is performed with high accuracy.

The apparatus for detecting a position of a substrate (i.e., the base part 11, the stage 2, the position detecting part 5, the imaging control part 611, and the substrate position calculation part 612) in the film thickness measuring apparatus according to the above preferred embodiment may be provided independently of the construction for ellipsometry of the measurement surface 91 of the substrate 9. For example, another stage (hereinafter, referred to as "ellipsometry stage") which is different from the stage 2 in the above apparatus is provided close to the apparatus, and application of polarized light from the lighting part 3, receiving of reflected light by the light receiving part 4, and calculation of a film thickness by ellipsometry are performed on the substrate 9 which is placed on the ellipsometry stage. In this case, the position and the orientation of the substrate 9 are detected by the apparatus, and the substrate 9 is placed on the ellipsometry stage while deviations about the position and the orientation of the substrate 9 are adjusted by a transfer mechanism which transfers the substrate 9 from the apparatus to the ellipsometry stage.

The spectroscopic ellipsometer according to the above preferred embodiments may be used in various measurements other than the film thickness measurement on the measurement surface 91 of the substrate 9. The apparatus for detecting a position of a substrate according to the above preferred embodiment (i.e., the base part 11, the stage 2, the position detecting part 5, the imaging control part 611, and the substrate position calculation part 612) may be used in an ellipsometer using a single wavelength and various apparatuses for performing measurement or processing on a substrate.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2007-229055 filed in the Japan Patent Office on Sep. 4, 2007, the entire disclosure of which is incorporated herein by reference.

What is claimed is:

1. An apparatus for detecting a position of a substrate, comprising:
    a base part;
    a substrate holding part which is provided above said base part, for holding an approximately disk-shaped substrate;
    an imaging part for acquiring a substrate image including a part of an edge of said substrate, a position of said substrate being fixed relatively to said base part;
    a rotation mechanism for rotating an image pickup area of said imaging part around a predetermined central axis to move said image pickup area along said edge, said central axis being perpendicular to a main surface of said substrate and fixed relatively to said base part;
    an imaging control part which picks up three or more substrate images at three or more image pickup positions around said central axis by controlling said imaging part and said rotation mechanism, and outputs said three or more substrate images, each of which includes a part of said edge of said substrate; and
    a substrate position calculation part for obtaining a relative position of said substrate to said base part in directions parallel to said main surface of said substrate, on the basis of said three or more substrate images.

2. The apparatus according to claim 1, wherein
said rotation mechanism rotates said image pickup area along said edge of said substrate by rotating said imaging part having an image pickup device around said central axis.

3. The apparatus according to claim 2, wherein
said image pickup device is a line sensor having a plurality of light receiving elements arranged in a line,
an arrangement direction of said plurality of light receiving elements corresponds to a radial direction with respect to said central axis in said image pickup area on said substrate, and
said image pickup area is rotated once along said edge while said image pickup device performs a continuous image pickup, to pick up an image of a whole of said edge of said substrate.

4. The apparatus according to claim 2, wherein
said image pickup device is a two-dimensional image pickup device having a plurality of light receiving elements which are arranged two-dimensionally along two arrangement directions perpendicular to each other, and a direction corresponding to one arrangement direction of said plurality of light receiving elements is parallel to a radial direction with respect to said central axis in said image pickup area on said substrate.

5. The apparatus according to claim 4, wherein
said image pickup area is rotated once along said edge while said image pickup device repeats an image pickup, to pick up an image of a whole of said edge of said substrate.

6. The apparatus according to claim 1, wherein
said imaging part comprises:
an image pickup device which is fixed relatively to said central axis; and
an imaging optical system for directing light from said image pickup area to said image pickup device, and
said rotation mechanism rotates said image pickup area along said edge of said substrate by rotating said imaging optical system around said central axis.

7. The apparatus according to claim 6, wherein
said image pickup device is a line sensor having a plurality of light receiving elements arranged in a line,
an arrangement direction of said plurality of light receiving elements corresponds to a radial direction with respect to said central axis in said image pickup area on said substrate, and
said image pickup area is rotated once along said edge while said image pickup device performs a continuous image pickup, to pick up an image of a whole of said edge of said substrate.

8. The apparatus according to claim 6, wherein
said image pickup device is a two-dimensional image pickup device having a plurality of light receiving elements which are arranged two-dimensionally along two arrangement directions perpendicular to each other, and
a direction corresponding to one arrangement direction of said plurality of light receiving elements is parallel to a radial direction with respect to said central axis in said image pickup area on said substrate.

9. The apparatus according to claim 8, wherein
said image pickup area is rotated once along said edge while said image pickup device repeats an image pickup, to pick up an image of a whole of said edge of said substrate.

10. The apparatus according to claim 1, wherein
one of said three or more substrate images is an image including a notch formed on said edge of said substrate.

11. The apparatus according to claim 1, wherein
a distance in a radial direction with respect to said central axis between said central axis and a center of said image pickup area is changeable by said rotation mechanism.

12. An ellipsometer, comprising:
a base part;
a substrate holding part which is provided above said base part, for holding an approximately disk-shaped substrate;
an imaging part for acquiring a substrate image including a part of an edge of said substrate, a position of said substrate being fixed relatively to said base part;
a rotation mechanism for rotating an image pickup area of said imaging part around a predetermined central axis to move said image pickup area along said edge, said central axis being perpendicular to a main surface of said substrate and fixed relatively to said base part;
an imaging control part which picks up three or more substrate images at three or more image pickup positions around said central axis by controlling said imaging part and said rotation mechanism, and outputs said three or more substrate images, each of which includes a part of said edge of said substrate;
a substrate position calculation part for obtaining a relative position of said substrate to said base part in directions parallel to said main surface of said substrate, on the basis of said three or more substrate images;
a holding part moving mechanism for moving said substrate holding part in two directions which are parallel to said main surface of said substrate and perpendicular to each other;
a moving mechanism control part for adjusting said relative position of said substrate to said base part by controlling said holding part moving mechanism, on the basis of said relative position obtained by said substrate position calculation part;
a lighting part for directing polarized light to a substrate which is held on said substrate holding part; and
a light receiving part for receiving reflected light of said polarized light to acquire a polarization state of said reflected light.

13. The ellipsometer according to claim 12, wherein
said rotation mechanism rotates said image pickup area along said edge of said substrate by rotating said imaging part having an image pickup device around said central axis.

14. The ellipsometer according to claim 12, wherein
said imaging part comprises:
an image pickup device which is fixed relatively to said central axis; and
an imaging optical system for directing light from said image pickup area to said image pickup device, and
said rotation mechanism rotates said image pickup area along said edge of said substrate by rotating said imaging optical system around said central axis.

15. The ellipsometer according to claim 12, wherein
one of said three or more substrate images is an image including a notch formed on said edge of said substrate.

16. A film thickness measuring apparatus for measuring a thickness of a film formed on a substrate, comprising:
a base part;
a substrate holding part which is provided above said base part, for holding an approximately disk-shaped substrate;
an imaging part for acquiring a substrate image including a part of an edge of said substrate, a position of said substrate being fixed relatively to said base part;
a rotation mechanism for rotating an image pickup area of said imaging part around a predetermined central axis to move said image pickup area along said edge, said central axis being perpendicular to a main surface of said substrate and fixed relatively to said base part;
an imaging control part which picks up three or more substrate images at three or more image pickup positions around said central axis by controlling said imaging part and said rotation mechanism, and outputs said three or more substrate images, each of which includes a part of said edge of said substrate;
a substrate position calculation part for obtaining a relative position of said substrate to said base part in directions parallel to said main surface of said substrate, on the basis of said three or more substrate images;
a holding part moving mechanism for moving said substrate holding part in two directions which are parallel to said main surface of said substrate and perpendicular to each other;

a moving mechanism control part for adjusting said relative position of said substrate to said base part by controlling said holding part moving mechanism, on the basis of said relative position obtained by said substrate position calculation part;

a lighting part for directing polarized light to a substrate which is held on said substrate holding part;

a light receiving part for receiving reflected light of said polarized light to acquire a polarization state of said reflected light; and a film thickness calculation part for obtaining a thickness of a film formed on said substrate on the basis of said polarization state acquired by said light receiving part.

17. The film thickness measuring apparatus according to claim 16, wherein said rotation mechanism rotates said image pickup area along said edge of said substrate by rotating said imaging part having an image pickup device around said central axis.

18. The film thickness measuring apparatus according to claim 16, wherein said imaging part comprises:

an image pickup device which is fixed relatively to said central axis; and an imaging optical system for directing light from said image pickup area to said image pickup device, and said rotation mechanism rotates said image pickup area along said edge of said substrate by rotating said imaging optical system around said central axis.

19. The film thickness measuring apparatus according to claim 16, wherein one of said three or more substrate images is an image including a notch formed on said edge of said substrate.

* * * * *